United States Patent [19]
Noguchi

[11] 3,784,432
[45] Jan. 8, 1974

[54] METHOD OF MAKING A FLEXIBLE CLOSURE

[76] Inventor: Takashi Noguchi, Seisan Nippon Sha, Ltd. New Kohjim-achi Bldg. 3, 5-Chome, Tokyo, Japan

[22] Filed: Sept. 7, 1971

[21] Appl. No.: 178,087

[52] U.S. Cl................. 156/244, 156/282, 156/322
[51] Int. Cl. ........................................... B29c 23/00
[58] Field of Search.................. 156/244, 282, 322, 156/498, 499, 500, 91, 92; 150/3

[56]  References Cited
UNITED STATES PATENTS

| | | | |
|---|---|---|---|
| 3,421,960 | 1/1969 | Arbit................................. | 156/500 |
| 3,532,571 | 10/1970 | Ausnit................................ | 156/500 |
| 3,075,868 | 1/1963 | Long.................................. | 156/282 |
| 3,575,762 | 4/1971 | Goehring et al.................... | 156/244 |
| 3,462,332 | 8/1969 | Goto.................................. | 156/244 |
| 3,543,379 | 12/1970 | Naito.................................. | 156/91 |

Primary Examiner—Daniel J. Fritsch
Assistant Examiner—Caleb Weston
Attorney—Carlton Hill et al.

[57]  ABSTRACT

A mechanism and method of attaching to a laminated plastic sheet a fastener profile wherein the preformed sheet is removed from a roll and passed through a heating chamber having controlled humidity and thereafter passing said sheet over a roll which forms a joining zone with an extruded plastic profile strip fed onto the sheet with a jet of air directed thereagainst, and the joined sheet and strip thereafter passing through a chamber where the strip is cooled and the heat in the sheet is maintained.

11 Claims, 2 Drawing Figures

PATENTED JAN 8 1974
3,784,432
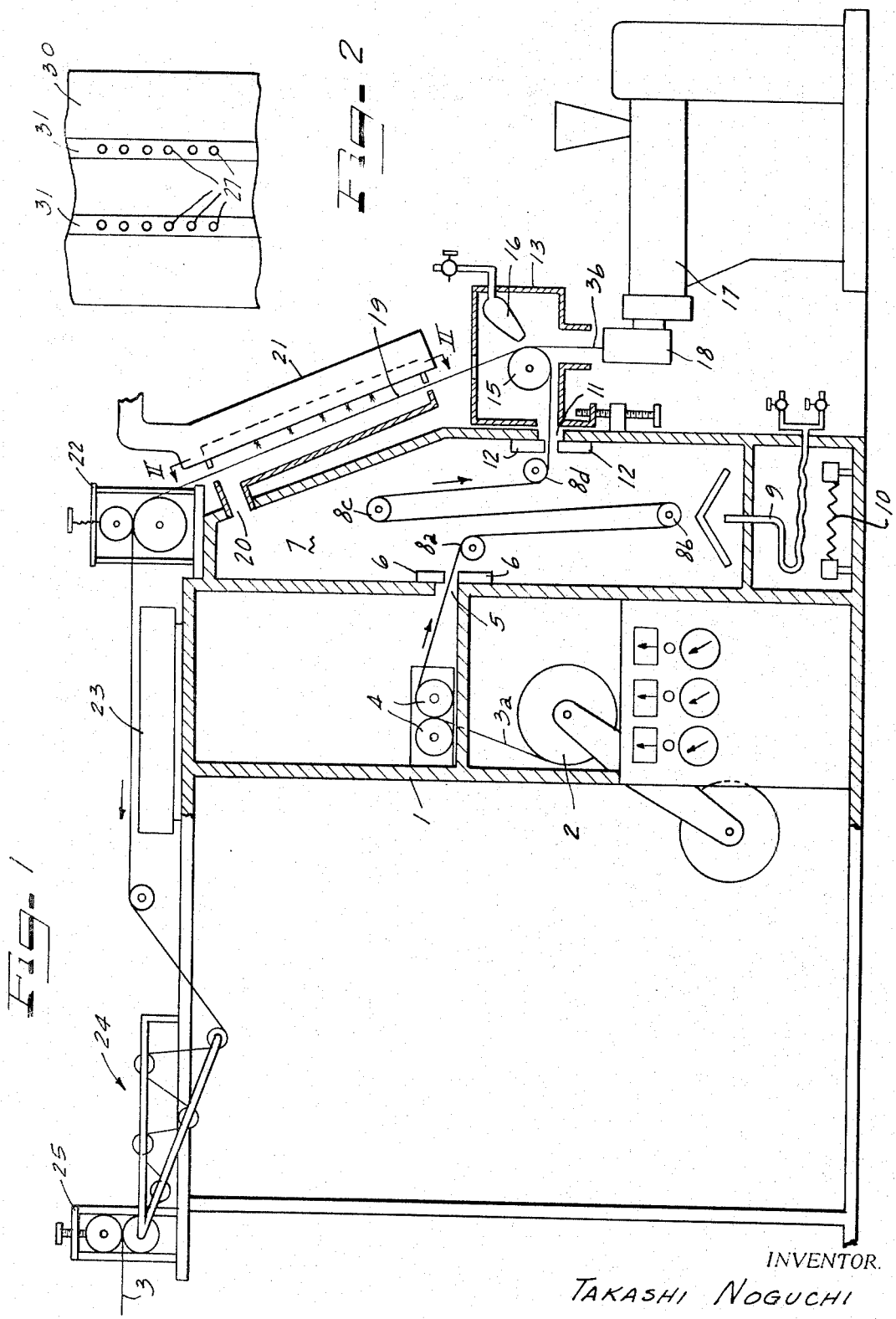
INVENTOR.
TAKASHI NOGUCHI
BY *Hill, Sherman, Meroni, Gross & Simpson* ATTORNEYS

METHOD OF MAKING A FLEXIBLE CLOSURE

BACKGROUND OF THE INVENTION

The invention relates to a method and apparatus of joining plastic fastener strips having fastener profiles thereon to a laminated film sheet by a continuous and automatic procedure. Reclosable plastic bags have gained conventional acceptance, with such bags being formed of a thin plastic film and having shaped rib and groove reclosable fastener profiles along the top. In their simplest form they consist of a simple sheet of film formed into a bag with the rib and groove fastener either formed integrally with the plastic of the bag or formed in a separate strip with the strip thereafter attached to the bag. Generally, the plastic of the fastener is of the same resin material as of the bag which may be of vinyl, polyethylene, polypropelene or a similar plastic material having a degree of flexibility and pliability. These plastics are used inasmuch as they could be readily converted into fasteners having the required features and because of heretofore available manufacturing methods.

Reclosable bags of this type formed of a single material are suitable for ordinary contents and allow said contents to be removed and replaced and also to be preserved to a degree. However, where the bag walls are made from a single plastic sheet, they will not insure a gas and moisture barrier inasmuch as the film from which they are formed can be penetrated. This permeability to air, gas or moisture makes such bags inappropriate for materials such as certain medicines or foods of the type wherein the quality is adversely affected by different gases, air or moisture. Therefore, in accordance with the principles of the present invention where it is necessary to package products that require air, gas or moisture protection, the bag bodies are made of laminations of films having one or more layers which are barrier films. Such laminations may include layers of cellophane, aluminum foil, different plastics and may also contain paper or other material for stiffness. With the methods presently available, it is impossible to produce a bag formed of a laminated film with a fastener strip thereon at the high commercial speeds necessary to make the bags feasible from an expense standpoint.

It has been found that laminating another different film onto the already formed integral fastener film will not work because when the two films are attached, the pressures added by the heating and pressing rolls cause the fastener profile to distort and become unusable. As will be recognized by those versed in the art, the reclosable interlocking fastener of a profil film is extremely small and relatively critical in size so that if either the rib and groove element becomes distorted or changed in size, the fastener will not close. Since closure is completed by applying a progressive pressure along the length of the fastener, if any defects occur along its length which interrupt closing, the fastener will become unworkable.

The only two other methods of joining a fastener to a laminated film would involve attaching them by using an adhesive between the fastener and the film or by fusing them by using a heat sealing bar.

The use of adhesives, however, avoids the necessity of the application of heat and the consequent distortion of the fastener profile, but this is unsatisfactory for various reasons. The application of heat in sufficient amount to maintain an economical speed, by a sealing bar to bag walls formed of laminations has caused shrink marks and wrinkles to appear during the cooling process because of the difference in thickness between the fastener profile strip and its web portion and the layer of film to which it is attached.

It is accordingly an object of the present invention to provide a mechanism and method which is capable of joining a profile fastener strip to a sheet formed of laminate film, continuously and automatically without encountering distortion of the fastener profile and without damaging the laminate film.

In accordance with the invention, the film is preheated and moisture conditioned by the addition of moisture and then the fastener strip is attached to the conditioned sheet substantially immediately after the strip is extruded while still in the uncooled state. The strip is fused to the heated laminated sheet without damaging the sheet and without distorting the profile. This is done by controlling the temperature of both film and fastener to a point suitable for them to fuse with each other. In accordance with a further feature of the invention, the joined strip and laminate film is conditioned by a special cooling treatment wherein differential cooling is accomplished. This differential cooling maintains the temperature of the laminated film and cools the profile strip in order to prevent the laminated film from shrinking or changing its form due to the difference in cooling rate between the thicker fastener profile strip and the thinner laminated film layer.

Various forms and modifications of the features of the invention will become apparent to those skilled in the art with the teaching of the principles of the invention in the claims, specification and drawings in which:

DESCRIPTION OF THE DRAWINGS

FIG. 1 is a somewhat schematic illustration of a laminating mechanism constructed and operating in accordance with the principles of the present invention; and FIG. 2 is a sectional view taken along the line II—II of FIG. 1.

DESCRIPTION OF THE PREFERRED EMBODIMENTS

As illustrated in FIG. 1, 1 shows a machine frame and 2 shows a roll of wound-up preformed laminated film, which is connected to the equipment for unwinding said roll. The film to be unwound 3a is pulled out by a take-up roll 4, and is transferred to a heating chamber 7 under controlled humidity (hereinafter called "preheating chamber"), and is given the desired preheating therein. The said preheating chamber 7 has an entrance 5 through which the film 3a, pulled up by the above mentioned take-up roll 4, is introduced, and said entrance 5 is surrounded by protectors 6 and 6 of felt or similar material so that the heating chamber 7 can be kept perfectly closed without damaging the film 3a as it passes therethrough. In the preheating chamber 7 there are provided a set of transport rolls 8a to 8d with the film 3a threaded through said rolls in a zig zag fashion in order to keep the film in the preheating chamber 7 as long as possible. The chamber 7 is connected with a vapor supply nozzle 9 and a heating source 10 and the humidity and temperature of the vapor supplied into the preheating chamber 7 through the supply nozzle 9, can be closely controlled. The heated film 3a is then transferred through an exit 11 of the preheating chamber 7 into a box 13 where it is joined with the fastener strips. The perimeter of this exit 11 is also protected by felt strips 12 and 12. Film 3a after transfer into the box 13 is moved towards its upper side around a joining roll 15 at which point the fastener strips 3b, extruded and formed continuously through the die 18 of the extruder 17, are attached to the surface of the film 3a, the fastener strips having been introduced into the box 13 through an opening provided in its lower part. An air blower 16 provided inside the box 13 blows air, having suitable temperature, to the joining point where the fastener strips 3b are attached to the film 3a on the above mentioned joining roll 15, in order to give pressure as well as to supply additional heat to the fastener strips.

Film 3a is fused and combined with the fastener strips 3b in said joining box 13 after which it is introduced into the heating and cooling box 19 where it is kept warm by hot air blown from chamber 7, so that the surface of the film will not cool too suddenly, and where only the area immediately adjacent the fastener strips and the strips themselves, which are difficult to cool due to their greater thickness, are cooled by cold air, to the same temperature as that of the rest of the film. That is to say, in said heating box 19 there is provided a cooling apparatus 21 which blows cold air to the area immediately adjacent the fastener strips, and where hot air delivered from the preheating chamber 7 is supplied via the entrance 20 of the heating box 19, to the surface of the film on the opposite side to the one which was combined with the fastener strips. After the above described process, film 3a with the joined fastener strips, is removed from the heating box 19 and is passed through a first set of rolls 22 and a second set of rolls 25 there being provided between said first and second sets of rolls a cooling apparatus 23 to cool down only the above mentioned heated surface of the film (the lower surface) and to now obtain equal cooling on the whole film. This invention consists of the above mentioned method and apparatus. These resolve themselves into the following:

A. Equipment for unwinding a roll of laminated film already formed in a separate process.
B. Means of preheating and of humidifying the said film.
C. Equipment for extruding fastener strips.
D. Means for joining the fastener strips to one surface of the film.
E. Heating and cooling equipment for heating the film joined with the fastener strips on one surface and cooling only the fastener strips and their surrounding area, on the other surface.
F. Cooling equipment for cooling the heated surface of the film.
G. Dancer rolls for controlling the tension of the film.

A more detailed explanation of some of the above steps follows.

The film 3a is pulled off the unwinding equipment and is preheated in the preheating chamber 7 and is then joined with the fastener strips, as mentioned above, with the temperature of this preheating chamber 7 being adjustable. If the film and fastener strips have the right temperature, they will join together readily. In this instance, however, while the fastener strips already have a temperature conducive to fusion, because they are joined to the film almost immediately after being delivered out of the extruder, the already formed film has to be given the proper heat, since without it, it does not have the required heat allowing it to be fused with the fastener. When a laminated film, such as cello-poly is strongly heated, a number of bubbles will appear on the polyethylene film, because a very small layer of air is usually trapped when the polyethylene is laminated to the cellophane, and stays between the two films and will expand when exposed to heat. This phenomenon, of course, depends on a number of factors, such as the surrounding pressure, the thickness of the polyethylene film, the temperature and duration of the heat exposure, and will happen at least within three or four seconds at 100°C under atmospheric pressure. Also, the film to which the fastener strips will be joined should be heated to the softening point of the polyethylene, and while it is necessary to give the film as high a temperature as possible without damaging it, a too low temperature will be insufficient to allow it to fuse. In addition, humidity also has to be given to the surface of the film at the same time that it is heated so as to prevent wrinkles being created on the film, by the heating or cooling process. Since certain laminated films, for example, cello-poly, lose humidity when heated, the surface of the film will curl up when cooled, because of the difference in contractability between the polyethylene and the cellophane. On the other hand, the laminated film cannot be given too much humidity, such as steam at 100°C, as it is heated, or it will curl on the side of the cellophane, because the shrink rate of the cellophane is greater than that of the polyethylene. Therefore, in the case of hygroscopic films, it is necessary to preheat the film, giving them only the proper amount of humidity, that is to say, it is necessary to supply and to maintain the correct temperature and humidity of the film by supplying the desired quantity of steam and heat automatically into the preheating chamber 7.

Next, we will explain about the box 13 where the preheated film is joined with the fastener strips. A comparatively heavier construction fastener will keep its post extrusion heat relatively well, but a comparatively lighter fastener will lose the temperature required to fuse and combine with the film, very quickly. Therefore, it is necessary to avoid such a loss of temperature. When the fastener strips are joined with the film, both of them are not only attached to each other, but the fastener strips are also pressed upon the film without damaging their interlocking shape. Thus, the fastener strips can be completely fused and combined with the film by blowing hot air at the joining point of the fastener strips and film through an air blower 16 located above the joining roll 15 and thereby at the same time putting pressure on them without damaging the shape of the fastener strips.

The hot air of the air blower 16 has the effect of maintaining a specific temperature in the area adjacent the location at which the fastener strips join with the film as well as generally inside the joining box 13 and thereby prevents the fastener strips from decreasing below a specific temperature.

The film with the fastener strips fused and combined thereon in the joining box 13 comes out of said box and is cooled. If both the fastener strips and the film are cooled at the same rate, noticeable shrink marks and wrinkles will appear in the area adjacent the joining point of the fastener strips and the film because the shrinking rate of the film is different from that of the fastener strips.

Therefore, it is necessary to equate both shrinking rates when the fastener film is cooled. In the heating and cooling box 19, one side of the film is heated while cool air is blown from the cooling equipment 21 to the other fastener film joining side, but then only to the area adjacent the fastener strips themselves.

As the film is transported continuously, it may develop some slack at certain points. This is adjusted and removed by controlling the speed of the dancer roll 24, the first or second transfer rolls 22 and 25, the take-up roll 4 or the unwinding equipment.

Thus, according to this invention, it is possible to join fastener strips to laminated film continuously, automatically and at high speed and to supply inexpensively and in large volume reclosable bags featuring laminated film having the barrier requirements that protect the contents therein.

The foregoing explanation covers the situation of joining fastener strips to film, but the method and apparatus of this invention is, of course, also applicable to joining plastic strips to film where said strips have purposes other than acting as fasteners.

The product will be a sheet of film with a strip means attached, such as shown in my copending application, Ser. No. 178,086 For example, the product may be a sheet of plastic with fastener profile strips and tear guide strips, which will subsequently be formed into a bag, such as shown in the copending application of Uramoto, Ser. No. 178,088.

I claim as my invention:

1. The method of forming a sheet having a shaped profile strip means thereon comprising the steps of:
    heating a preformed sheet to a temperature sufficient to permit fusion to a plastic strip but less than the deterioration temperature of the film,
    extruding a plastic strip of heated plastic material having a small critical profile shape and immediately directing it against the sheet at a joining zone while the plastic is hot so that the profile strip is fused to the surface of the heated sheet.

2. The method of forming a sheet having a shaped profile strip means thereon in accordance with the steps set forth in claim 1:
    wherein a jet of heated air is directed against the outer surface of the profile strip at the joining zone to urge the strip and sheet together at that location.

3. The method for forming a sheet having a shaped profile strip means thereon in accordance with the steps of claim 1:
    and including the step of passing the sheet through a zone of increased moisture prior to the joining zone to prevent excessive drying of the film from heating.

4. The method of forming a sheet having a shaped profile strip means thereon in accordance with the steps set forth in claim 1:
    and wherein the strip is cooled by a cooling fluid directed at said strip following the joining zone.

5. The method of forming a sheet having a shaped profile strip means thereon in accordance with the steps set forth in claim 1:
    and wherein the strip is cooled by a cooling fluid directed at said strip following the joining zone while heat is added to the sheet to maintain its temperature.

6. The method of forming a sheet having shaped profile strip means thereon in accordance with the steps of claim 1:
    wherein said preformed sheet is a laminated film formed of a plurality of layers of material.

7. The method of forming a sheet having a shaped profile strip means thereon in accordance with the steps of claim 1:
    wherein the profile strip and sheet are urged together by an air jet to increase the surface pressure therebetween them and for joining the profile strip to the sheet.

8. The method of forming a sheet having a shaped profile strip means thereon in accordance with the steps of claim 1:
    wherein the sheet is heated subsequent to said joining zone to maintain the temperature of the film after the joining zone.

9. The method of forming a sheet having shaped profile strip means thereon in accordance with claim 8:
    wherein the sheet is cooled after its temperature has been maintained for a predetermined period of time.

10. The method of forming a sheet having a shaped profile strip means thereon in accordance with claim 1:
    wherein the profile strip and the area of the sheet immediately adjacent thereto are cooled following the joining zone, and the sheet is heated to maintain its temperature.

11. The method of forming a sheet having a shaped profile strip means thereon in accordance with the steps of claim 10:
    wherein the sheet is subsequently cooled after its temperature has been maintained following the joining zone.

* * * * *